Aug. 5, 1941.  F. B. LOMAX  2,251,684
EGG FILTRATION PROCESS
Filed May 4, 1938
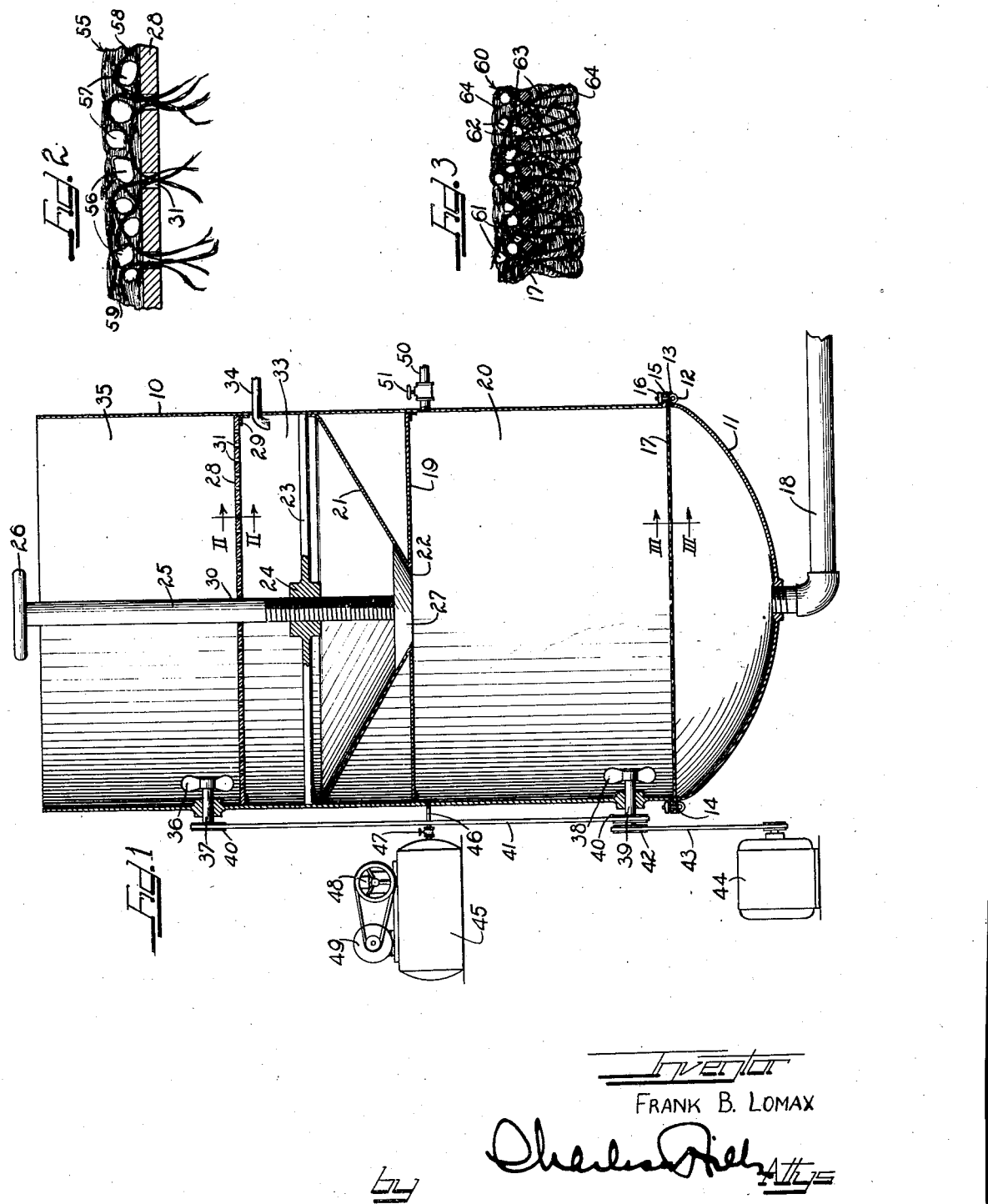
Inventor
FRANK B. LOMAX
by Charles Riely Attys Patented Aug. 5, 1941

2,251,684

UNITED STATES PATENT OFFICE 2,251,684

EGG FILTRATION PROCESS

Frank B. Lomax, Chicago, Ill.

Application May 4, 1938, Serial No. 205,945

1 Claim. (Cl. 99—113)

This invention relates to the treatment of liquid egg material for the removal of shell fragments, lumps, meat balls, chalaza and the like impurities.

More particularly the invention relates to a process of filtering liquid egg material under positive pressure and provides for the rapid supplying of egg material to a pressure chamber so as to increase the capacity of apparatus for carrying out the process.

It has heretofore been proposed to supply air or gas under pressure above a pond of liquid egg material for forcing the egg material through a relatively fine mesh filter screen. Such practice has required considerable time between filtering operations to release the gas pressure, clean out the filter screen, introduce a new batch of egg material, seal the pressure chamber and build up the pressure in the chamber.

The present process now greatly lessens the time for recharging the pressure vessel and increases the capacity of the fine mesh filter member.

According to this invention, broken egg material is dumped into an open topped tank above a perforated plate extending transversely across the tank in spaced relation from the top thereof. A pond of egg material is thus formed on the perforated plate. This pond may be agitated to uniformly mix the material by an agitator acting thereon beneath the surface of the pond. The foraminations in the plate are of a comparatively large size so as to remove only the larger sized shell fragments, lumps, meat balls, and chalaza particles from the liquid material.

The liquid egg material is allowed to drain through the perforated plate to a lower level in the tank where it is collected on a downwardly sloping partition having an opening therethrough that is closed by a plunger or valve. The space between the partition and the perforated plate is vented to the atmosphere or can be subjected to suction for speeding up the drainage through the perforated plate.

The opening in the partition communicates with a pressure chamber in the tank having a fine mesh filter screen extending transversely across the bottom thereof.

The tank has a rounded bottom receiving a drain line.

Air or other gas is supplied under pressure to the top of the pressure chamber for positively forcing the pre-treated egg material through the fine mesh filter screen. This screen removes the solid impurities of a size small enough to pass through the perforated plate.

In carrying out the process, therefore, a batch of treated egg materials is continuously accumulated above the pressure chamber for intermittent feeding into the chamber. Since the larger sized impurities are removed from the material introduced into the pressure chamber, the work to be accomplished by the fine mesh filter screen is materially lessened. As a result, the screen can be used over prolonged periods of time without becoming too clogged for efficient operation.

It is, then, an object of this invention to provide a process for filtering egg material under positive pressures and to decrease the amount of time heretofore necessary to reload the pressure apparatus.

Another object of the invention is to pretreat liquid egg material for removing large size impurities therefrom and to then remove the finer impurities by pressure filtration.

Another object of the invention is to treat liquid egg material by drainage through large size holes for removing only the larger sized impurities in the material and to then collect a batch of the pretreated material for flowing into a pressure filtration chamber.

Another object of the invention is to continuously prepare liquid egg material for intermittent feeding into a batch filter.

A further object of the invention is to provide apparatus for removing large sized impurities from liquid egg material, for collecting the thus treated material and for flowing this material into a pressure compartment including a fine mesh filter screen therein.

Other and further objects of the invention will become apparent from the following detailed description of the annexed sheet of drawings which discloses a preferred apparatus for carrying out the process and also illustrates the type of impurities removed by the various filters of the apparatus.

On the drawing:

Figure 1 is a vertical cross-sectional view, with parts shown in elevation, of an apparatus for carrying out the process of the invention.

Figure 2 is an enlarged cross-sectional view taken along the line II—II of Figure 1 and illustrating the filtering operation through the perforated plate.

Figure 3 is an enlarged cross-sectional view taken along the line III—III of Figure 1 and illustrating the filtering operation through the fine mesh screen.

As shown on the drawing:

In Figure 1 the reference numeral 10 designates a tank having a detachable rounded bottom 11. The bottom 11 can be secured to the tank 10 by means of eye bolts 12. For the purpose of securing the bottom 11 to the tank 10, the bottom is provided with an outturned annular flange 13 carrying ears or lugs at spaced intervals therebeneath for pivotally supporting the eye bolts 12. The bottom of the tank 10 has an outturned annular flange 15 provided with spaced slots around its periphery for receiving the shanks of the eye bolts therethrough. Nuts 16 threaded on the bolts 12 draw the flanges 13 and 15 together for holding the bottom 11 in position.

A fine mesh filter screen 17 extends transversely across the bottom of the tank 10 and its outer periphery is clamped between the flanges 13 and 15. If desired a gasket may be inserted between the flanges for preventing leakage.

The rounded bottom 11 has a drain line 18 communicating with the lowermost portion thereof for removing material filtered through the screen 17.

A partition member 19 is mounted in the tank 10 in spaced relation above the filter screen 17 to define a pressure chamber 20 in the tank.

The partition member 19 has a downwardly sloping top wall 21 converging to an opening 22 formed through the member in the center of the tank.

A spider 23 is secured in the tank above the top wall 21 of the partition member 19 and has a boss portion 24 at the center of the tank provided with a vertically threaded bore therethrough for receiving in threaded relation therewith a vertical shaft 25 terminating above the top of the tank and having an operating wheel 26 secured to the top end thereof. The bottom of the shaft 25 carries a plunger or valve member 27 adapted to seat on the sloping top wall 21 of the partition member 19 for sealing the opening 22.

A rotation of the shaft 25 by operation of the hand wheel 26 carries the plunger 27 toward or away from its seat on the wall member 21 for opening or closing the opening 22.

A perforated plate 28 is mounted on a flanged ring 29 in the tank 10 to extend transversely across the tank above the spider 23. The plate 28 has a large central opening 30 snugly receiving the shaft 25 therethrough.

The plate 28 is provided with relatively large sized perforations 31 extending therethrough.

A chamber 33 is thus provided between the sloping wall 21 and the plate 28. This chamber is vented to the atmosphere by means of a pipe 34 opening downwardly in the chamber to prevent drainage of egg material therethrough. If desired, the pipe 34 can be connected with a suction pump to evacuate the chamber 33.

The plate 28 is spaced from the top of the tank 10 so as to form an open topped chamber 35.

An agitator or propeller 36 is mounted in the chamber 35 immediately above the plate 28 on a shaft 37 extending through the side wall of the tank 10.

A second agitator or propeller 38 is mounted in the chamber 20 of the tank above the filter screen 17 on a shaft 39 extending through the side wall of the tank.

The shafts 37 and 39 have pulleys 40 secured to their outer ends. A belt 41 is trained around the pulleys 40 for operatively connecting the shafts 37 and 39. The shaft 39 also has a second pulley 42 secured thereon for receiving a belt 43 therearound driven by a motor 44. The motor 44 thus drives both of the agitators 36 and 38.

The chamber 20 is subjected to gas pressure from a pressure tank 45 communicating with the chamber 20 through a pipe 46 entering the top of the chamber. The pipe 46 has a valve 47 therein.

As shown, the pressure tank 45 has an air compressor 48 mounted thereon driven by a motor 49. It should be understood, however, that the tank can house inert gases other than air for building up the pressure in the chamber 20. Gases such as carbon dioxide and nitrogen are suitable.

A vent 50 having a valve 51 therein communicates with the top of the chamber 20 for releasing the pressure in the chamber.

In carrying out the process of the invention, broken egg material such as it comes from the breaking tables including shell fragments, lumps, meat balls, large size chalaza particles and the like is dumped into the chamber 35 of the tank 10 to form a pond 55 on the plate 28 as shown in Figure 2. The pond 55 can be agitated from beneath the surface thereof by the propeller 36 for uniformly stirring the egg material into a homogeneous mass.

The pond 55 contains shell fragments 56, lumps 57, chalaza strings 58 and the desired liquid egg meats 59.

Since the chamber 33 beneath the plate 28 is vented to the atmosphere or is subjected to suction, the desired egg material 59 can drain through the large sized perforations 31 of the plate 28. These perforations also permit the passage of some solid impurities so that only the larger size material 56, 57 and 58 is retained on the plate.

The material draining through the plate 28 is collected in the chamber 33 when the plunger 27 is in the position shown in Figure 1.

When the plunger 27 is raised off of its seat on the wall 21 the collected egg material in the chamber 33 flows into the chamber 20 and is collected on top of the fine mesh screen 17 at the bottom of this chamber. The plunger 27 is then reseated to close the opening 22, the valve 51 in the vent 50 is closed and the valve 47 in the pipe 46 is opened to build up gas pressure in the chamber 20 above the pond of egg material collected on the filter 17. This pond is shown at 60 in Figure 3 and comprises the smaller size shell fragments 61, lumps 62 and chalaza particles 63 that have passed through the plate 28 together with the desired liquid egg meats 64.

The agitator 38 can be operated to further mix the liquid egg material in the pond 60. The filter screen 17 retains the impurities 61, 62 and 63 thereon but allows the passage of the desired liquid egg meats 64 therethrough. As shown in Figure 3, the chalaza string 63 may retain some of the liquid egg meats 64 on the under side of the screen 17. The filter bed thus built up further refines the filtering operation so that only the purified liquid egg meats are collected in the bottom 11 for drainage through the drain line 18 into a collection chamber (not shown).

During the time required for the pressure filtration through the screen 17 an additional batch of egg material is accumulated in the chamber 33. At the end of the filtering operation in the chamber 20, the valve 47 is closed, and the valve 51 is opened to release the pressure in the chamber. The hand wheel 26 is then manipulated to raise the plunger 27 off of the wall 21 and to allow the new batch of pretreated egg material to flow into the chamber 20.

From the above description it should be understood that the process and apparatus of this invention provides for the filtration of egg material under positive pressures and the accumulation of batches of pretreated egg material above the pressure filter for rapid feeding into the filter chamber. The process of this invention is much more rapid than heretofore known processes involving batch filtration of egg material under superatmospheric pressures.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

The method of filtering liquid egg material which comprises disposing a given batch of the material in a given area open to atmosphere, forcing the material in said area downwardly through a filtering medium, agitating the material above said filtering medium, intermittently feeding the material from said area directly into an adjoining area, closing said adjoining area to atmospheric pressure, and forcing, by gas under pressure introduced in said adjoining area, the material therein through a second filtering medium.

FRANK B. LOMAX.